United States Patent [19]

Vance

[11] Patent Number: 4,462,107
[45] Date of Patent: Jul. 24, 1984

[54] RADIO RECEIVER FOR FREQUENCY SHIFT KEYED SIGNALS

[75] Inventor: Ian A. W. Vance, Newport, England

[73] Assignee: International Standard Electric Corporation, New York, N.Y.

[21] Appl. No.: 394,059

[22] Filed: Jul. 1, 1982

[30] Foreign Application Priority Data

Jul. 16, 1981 [GB] United Kingdom ............... 8121877

[51] Int. Cl.³ .......................................... H04L 27/14
[52] U.S. Cl. .................................... 375/88; 329/104; 329/112
[58] Field of Search ...................... 375/80, 83, 84, 85, 375/88, 104, 45; 329/110, 112, 122; 328/134, 141

[56] References Cited

U.S. PATENT DOCUMENTS

| | | | |
|---|---|---|---|
| 3,500,217 | 3/1970 | Allen | 329/112 |
| 3,619,785 | 11/1971 | Farrow | 375/104 |
| 4,156,194 | 5/1979 | Mueller | 329/122 |
| 4,193,034 | 3/1980 | Vance | 375/88 |
| 4,254,503 | 3/1981 | Vance | 375/88 |
| 4,322,851 | 3/1982 | Vance | 375/88 |

Primary Examiner—Benedict V. Safourek
Assistant Examiner—Stephen Chin
Attorney, Agent, or Firm—John T. O'Halloran; Peter R. Ruzek

[57] ABSTRACT

A radio receiver for frequency shift keyed signals of the zero I.F. type. The quadrature outputs of mixers are low-pass filtered and a 90° phase shift at the baseband frequency is introduced in one signal path. The baseband signals are then fully limited and applied to a logic network to provide a digital output indicative of the relative lead/lag condition of the two signal paths. The logic network can conveniently be an EXCLUSIVE-OR gate.

15 Claims, 5 Drawing Figures

RADIO RECEIVER FOR FREQUENCY SHIFT KEYED SIGNALS

BACKGROUND OF THE INVENTION

The present invention relates to a radio receiver for frequency shift keyed (FSK) signals on an RF (radio frequency) carrier.

In a conventional superhet receiver the image response of the receiver is a first-order response and must be filtered out. A continual trade-off must be made between selectivity and loss due to the finite "Q" of the filter elements. In small size equipments this problem becomes extreme as the obtainable "Q" is lower. Furthermore, even in single channel applications the several sections of filtering need to be individually adjusted thus, increasing assembly costs.

In the particular case of receivers for wide-area pocket paging systems all these problems are present simultaneously. Small size leads to low "Q", but low losses are required as sensitivity must be high to overcome the poor antenna performance arising from the requirement for small volume. Both size and cost favor an integrated circuit approach, but this is difficult to realize with a superhet. Also very low power consumption is of great importance in this application. In general, there is a direct trade-off between circuit bandwidth and power consumption and so it is most economical of current to obtain as much gain, and to perform the signal processing, at as low a frequency as possible.

One solution to the problems outlined hereinabove is given in U.S. Pat. No. 4,193,034 which discloses first and second signal paths, each signal path including a mixer circuit followed by a low pass filter and a limiting amplifier stage, a local oscillator running at the carrier frequency, the local oscillator output being applied to one mixer circuit direct, means for applying the oscillator output to the other mixer circuit with a 90° phase shift, and a D-type clocked flip-flop to the D input of which is applied the output of one of the limiting amplifier stage and the output of the other limiting amplifier stage is applied to the clock input of the flip-flop.

SUMMARY OF THE INVENTION

An object of the present invention is to provide another solution to the problems outlined hereinabove.

Another object of the present invention is to provide an improved radio receiver for FSK signals modulated on an RF carrier.

A feature of the present invention is the provision of a radio receiver for a received signal consisting of frequency shift keyed (FSK) signals carried on a radio frequency (RF) carrier comprising at least first and second signal paths to which the received signal is applied, each of the first and second paths including a mixer circuit and a low pass filter connected to the output of the mixer circuit; a local oscillator operating at a frequency equal to the frequency of the RF carrier coupled to each of the mixer circuits to mix the received signal with an output signal from the oscillator; a 90° RF phase shifter coupled to a selected one of the oscillator output signal and the received signal such that the output signals of the mixer circuits are in phase quadrature; a 90° bandpass phase shifter coupled to the output of one of the filters; and a first digital logic network coupled to the output of each of the first and second signal paths to provide a digital output representing the FSK signals.

In its simplest form the digital logic network is realized by an EXCLUSIVE-OR gate.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
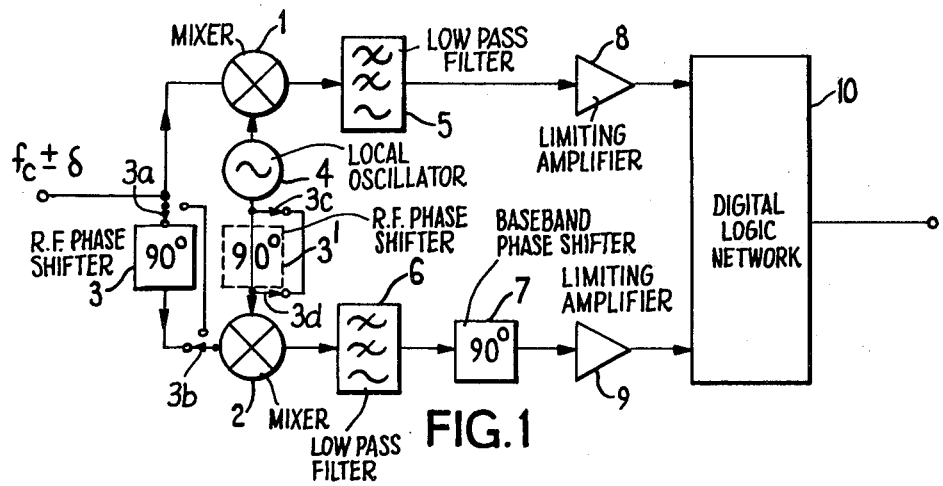
FIG. 1 is a block diagram of a first embodiment of a radio receiver in accordance with the principles of the present invention.

In the receiver arrangement shown in FIG. 1 the received RF signals of frequency $f_c \pm \delta$, where $f_c$ is the carrier frequency and $\delta$ is the FSK modulation deviation, are fed directly to a first mixer circuit 1 and via a phase shifter 3 to a second mixer circuit 2. The phase shifter imparts a 90° phase shift at the carrier frequency $f_c$. A local oscillator 4 operating at the carrier frequency $f_c$ has its output fed to the two mixer circuits 1 and 2. The outputs of mixer circuits 1 and 2 are passed through low-pass filters 5 and 6, respectively. The outputs of filters 5 and 6 are then the difference frequency between the input signal and the local oscillator. The output of filter 6 is then subjected to a 90° phase shift at the baseband frequency in a second phase shifter 7. Both signals are applied to respective limiting amplifiers 8 and 9 such that the outputs are fully limited waveforms. These outputs are then treated as digital signals and are processed in a digital logic network 10.

As an alternative to imposing a 90° phase shift at the carrier frequency on the RF input, it is equally possible to have a 90° phase shift in the local oscillator frequency $f_c$ applied to one of the mixers, as indicated in FIG. 1 by phase shifter 3'. Switches 3a and 3b would be moved to bypass phase shifter 3 and switches 3c and 3d would be moved to place phase shifter 3' in the circuit.

Figure 2:
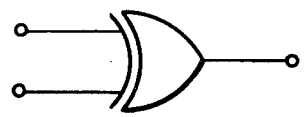
FIG. 2 is a block diagram of an EXCLUSIVE-OR gate.

The difference frequency $\delta$ is constant whether the input signal is deviated high or low of the carrier frequency $f_c$. However, due to the change in phase when mixing from the opposite sides of the local oscillator the outputs from the filters 5 and 6 change in relative phase for the two conditions. That is they are always 90° apart, but the relative lead/lag condition inverts as the input signal moves from high to low of the oscillator signal. The further fixed 90° phase shift at the difference frequency then results in the outputs from the limiting amplifiers 8 and 9 being in-phase for the frequency deviation in one direction and 180° out of phase for the deviation in the other direction. These two conditions can be distinguished by the network 10 which, in its simplest form is a single EXCLUSIVE-OR gate as illustrated in FIG. 2. The output of this gate is then a logic "one" for deviation of the input signal in one direction and a logic "zero" for deviation of the input signal in the other direction. Hence, the system as described demodulates the FSK input to a logic output.

In such a receiver with a simple decoding arrangement there is a constraint on the rate at which switching of the gate in response to modulation of the received signal can occur. That is, there must be at least one edge on one input to the gate in each information bit period. This constraint also holds true in the limiting amplifiers. Since these components preserve zero crossings while limiting amplitude information it is necessary for some zero crossings to occur when the signal is on each side of the local oscillator signal. As the relative phase of the baseband signals on each side of the carrier is arbitrary there will be a variable delay in the changeover of the decoder output in response to the frequency shift of the input signal.

To overcome this inherent speed limitation, it is possible to generate interleaved phase paths to allow operation at faster FSK rates. In the arrangement shown in FIG. 3 the basic 0° and 90° paths feed EXCLUSIVE-OR gate 11 in the manner described for FIG. 1. However, each of the low-pass filter outputs is also fed to two resistive networks 12 and 13 to synthesize extra phases at 45° and 135°, respectively. One of these is then 90° phase shifted in network 14.

Figure 4:
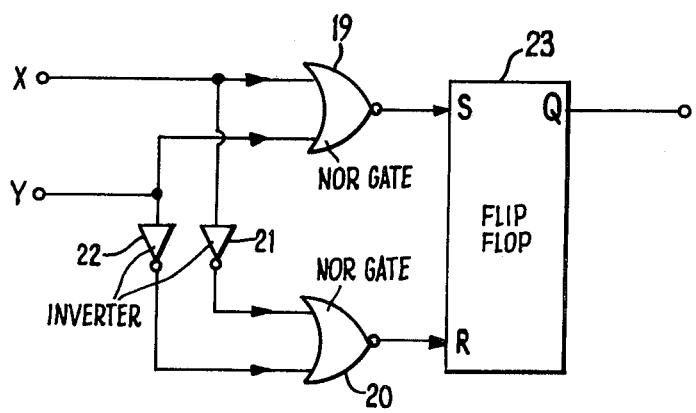
FIG. 4 is a block diagram of a logic network employed in the embodiment of FIG. 3.

The two extra phases are then limited in amplifiers 15 and 16 and the fully limited waveforms are applied to EXCLUSIVE-OR gate 17. A logical adding circuit 18 is required to combine optionally the output from the two EXCLUSIVE-OR gates. Conveniently, this is an edge-triggered set-reset flip-flop 23 as shown in FIG. 4 fed from two two-input NOR gates 19 and 20, one combining the X and Y inputs and the other combining the X and Y inputs inverted in inverters 21 and 22.

Figure 5:
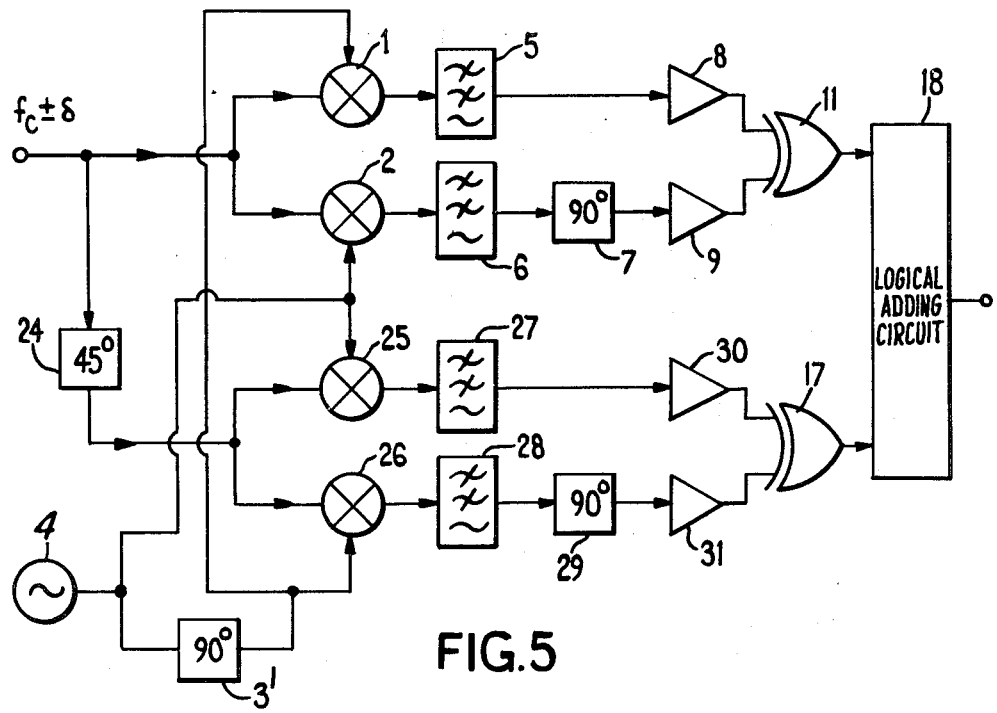
FIG. 5 is a block diagram of a third embodiment of a radio receiver in accordance with the principles of the present invention.
Figure 3:
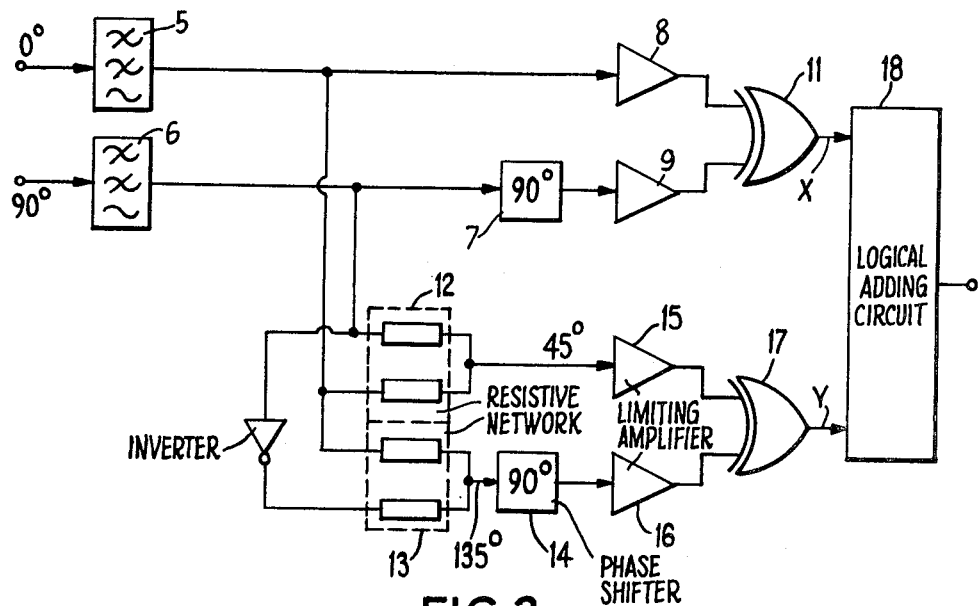
FIG. 3 is a block diagram of a second embodiment of a radio receiver in accordance with the principles of the present invention.

Instead of introducing 45° and 135° phase shifts respectively into the low pass filtered signals, as shown in FIG. 3, to derive an extra pair of signals for demodulation, it is possible to use the arrangement shown in FIG. 5. A 45° phase shifter 24 is inserted into the RF portion of the receiver to provide an input for a second pair of mixers 25 and 26. The local oscillator 4 and 90° phase shifter $3^1$ now feed both the original mixers 1 and 2 and also the additional mixers 25 and 26. The second pair of signal paths is identical with the first pair, with low pass filters 27 and 28, baseband 90° phase shifter 29 and limiting amplifiers 30 and 31. The logic network corresponds to that of FIGS. 3 and 4.

Note that in principle the receiver can have N pairs of paths, with 90°/N phase difference between the pairs.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radio receiver for a received signal consisting of frequency shift keyed (FSK) signals carried on a radio frequency (RF) carrier comprising:

at least first and second signal paths to which said received signal is applied, each of said first and second paths including a mixer circuit and a low pass filter connected to the output of said mixer circuit;

a local oscillator operating at a frequency equal to the frequency of said RF carrier coupled to each of said mixer circuits to mix said received signal with an output signal from said oscillator;

a 90° RF phase shifter coupled to a selected one of said oscillator and said received signal such that the output signals of said mixer circuits are in phase quadrature;

a 90° baseband phase shifter coupled to the output of one of said filters; and a first digital logic network coupled to the output of each of said first and second paths and operative for issuing a digital output representing said FSK signals, said digital output being respectively at a first and a second level when the phases of the output signals of the other of said filters and of said phase shifter respectively coincide and are 180° apart.

2. A radio receiver for a received signal consisting of frequency shift keyed (FSK) signals carried on a radio frequency (RF) carrier comprising:

at least first and second signal paths to which said received signal is applied, each of said first and second paths including a mixer circuit and a low pass filter connected to the output of said mixer circuit;

a local oscillator operating at a frequency equal to the frequency of said RF carrier coupled to each of said mixer circuits to mix said received signal with an output signal from said oscillator;

a 90° RF phase shifter coupled to a selected one of said oscillator and said received signal such that the output signals of said mixer circuits are in phase quadrature;

a 90° baseband phase shifter coupled to the output of one of said filters;

means coupled to each of said low pass filters to provide third and fourth signal paths in which the signals are respectively in 45° and 135° phase relationship with signals in said first path;

an additional 90° baseband phase shifter disposed in a selected one of said third and fourth paths;

a first digital logic network coupled to the output of each of said first and second signal paths to provide a digital output representing said FSK signals;

a second digital logic network coupled to the output of said third and fourth paths; and a logical adding circuit coupled to the outputs of said first and second logic networks.

3. A receiver according to claim 5, further including a second pair of limiting amplifiers each disposed in a different one of said third and fourth paths coupled to said means in one of said third and fourth paths and to said additional baseband phase shifter in the other of said third and fourth paths;

and wherein said second digital logic network is coupled to the output of said second pair of amplifiers.

4. A receiver according to claim 2, further including a pair of limiting amplifiers each disposed in a different one of said third and fourth paths coupled to said means in one of said third and fourth paths and to said additional baseband phase shifter in the other of said third and fourth paths;

and wherein said second digital logic network is coupled to the output of said pair of limiting amplifiers.

5. A receiver according to claim 2, further including a first pair of limiting amplifiers, each disposed in a different one of said first and second paths coupled between said first logic network and said low pass filter of one of said first and second paths and coupled between said first logic network and said baseband phase shifter of the other of said first and second paths.

6. A receiver according to claims 1 or 5, wherein said first logic network is an EXCLUSIVE-OR gate.

7. A receiver according to claims 3, 4 or 2, wherein each of said first and second logic networks is an EXCLUSIVE-OR gate.

8. A radio receiver for a received signal consisting of frequency shift keyed (FSK) signals carried on a radio frequency (RF) carrier comprising;
at least first and second signal paths to which said received signal is applied, each of said first and second paths including a mixer circuit and a low pass filter connected to the output of said mixer circuit;
a local oscillator operating at a frequency equal to the frequency of said RF carrier coupled to each of said mixer circuits to mix said received signal with an output signal from said oscillator;
a 90° RF phase shifter coupled to a selected one of said oscillator and said received signal such that the output signals of said mixer circuits are in phase quadrature;
a 90° baseband phase shifter coupled to the output of one of said filters;
a first digital logic network coupled to the output of each of said first and second signal paths to provide a digital output representing said FSK signals;
a 45° phase shifter to which said received signal is applied;
third and fourth signal paths coupled to the output of said 45° phase shifter, each of said third and fourth paths including an additional mixer circuit and an additional low pass filter connected to the output of said additional mixer circuit, said additional mixer circuits being coupled to said local oscillator and said RF phase shifter to provide output signals of said additional mixer circuits in phase quadrature;
an additional 90° baseband phase shifter coupled to one of said additional low pass filters;
a second digital logic network coupled to the outputs of said third and fourth paths; and
a logical adding circuit coupled to the output of said first and second logic networks to provide a digital output.

9. A receiver according to claim 8, further including a pair of limiting amplifiers each disposed in a different one of said third and fourth paths coupled to said additional low pass filter in one of said third and fourth paths and to said additional baseband phase shifter in the other of said third and fourth paths;
and wherein said second digital logic network is coupled to the outputs of said pair of amplifiers.

10. A receiver according to claim 8 further including a first pair of limiting amplifiers, each disposed in a different one of said first and second paths coupled between said first logic network and said low pass filter of one of said first and second paths and coupled between said first logic network and said baseband phase shifter of the other of said first and second paths;
and wherein said second digital logic network is coupled to the outputs of said second pair of amplifiers.

11. A receiver according to claims 10, 9 or 8, wherein each of said first and second logic networks is an EXCLUSIVE-OR gate.

12. A receiver according to claims 3, 4, 2, 10, 9 or 8, wherein
said logical adding circuit includes
a first two-input NOR gate coupled to said output of said first and second logic networks,
a pair of inverters each coupled to said output of said first and second logic networks,
a second two-input NOR gate coupled to the output of said pair of inverters, and
a set-reset flip-flop having its set input coupled to one of said first and second NOR gates and its reset input coupled to the other of said first and second NOR gates.

13. A receiver according to claims 1, 5, 3, 4 or 2, wherein
said RF phase shifter is coupled to one of said first and second signal paths to apply said received signal to an associated one of said mixer circuits.

14. A receiver according to claims 1, 5, 3, 4, 2, 10, 9 or 8, wherein
said RF phase shifter is coupled between said local oscillator and one of said mixer circuits.

15. A radio receiver for a received signal consisting of frequency shift keyed (FSK) signals carried on a radio frequency (RF) carrier comprising:
N pairs of signal paths to which said received signals are applied, where N is an integer greater than one, each path of said N pairs of paths including a mixer circuit and a low pass filter coupled to the output of said mixer circuit;
a local oscillator operating at a frequency equal to the frequency of said RF carrier coupled to each of said N pairs of paths to be mixed with said received signal such that the output signals of each of said mixer circuits of each of said N pair of paths are in phase quadrature;
means to couple said received signal to each of said N pair of paths such that there is a phase difference of 90°/N between said received signal applied to each of said N pairs of paths;
a 90° baseband phase shifter coupled to the output of said low pass filter of one of the paths of each of said N pair of paths; and
logic means coupled to the output of said N pair of paths to provide a digital output representing said FSK signal.

* * * * *